(12) United States Patent
Dowd

(10) Patent No.: US 8,451,867 B2
(45) Date of Patent: May 28, 2013

(54) NETWORK TIME PROTOCOL PRECISION TIMESTAMPING SERVICE

(75) Inventor: Gregory Louis Dowd, San Jose, CA (US)

(73) Assignee: Symmetricom, Inc., San Jose, CA (US)

( * ) Notice: Subject to any disclaimer, the term of this patent is extended or adjusted under 35 U.S.C. 154(b) by 1128 days.

(21) Appl. No.: 11/749,666

(22) Filed: May 16, 2007

(65) Prior Publication Data

US 2007/0268938 A1 Nov. 22, 2007

Related U.S. Application Data

(60) Provisional application No. 60/802,023, filed on May 19, 2006.

(51) Int. Cl.
*H04L 7/00* (2006.01)
*H04L 7/02* (2006.01)
*H04J 3/06* (2006.01)
*H04J 3/07* (2006.01)

(52) U.S. Cl.
USPC ........... 370/503; 370/507; 370/509; 370/516; 370/517; 370/519; 375/354; 375/356; 375/358; 375/359

(58) Field of Classification Search
USPC .. 370/389, 503, 509, 516, 517, 519; 375/354, 375/356, 358, 359
See application file for complete search history.

(56) References Cited

U.S. PATENT DOCUMENTS

| | | | | |
|---|---|---|---|---|
| 4,673,979 | A * | 6/1987 | Kobo et al. | 348/464 |
| 6,535,057 | B2 * | 3/2003 | Chakravarthy | 327/551 |
| 6,985,499 | B2 * | 1/2006 | Elliot | 370/503 |
| 7,603,137 | B1 * | 10/2009 | Elliott | 455/552.1 |
| 2004/0008661 | A1 * | 1/2004 | Myles et al. | 370/350 |
| 2004/0062278 | A1 | 4/2004 | Hadzic et al. | |
| 2005/0125150 | A1 | 6/2005 | Wang | |
| 2005/0160272 | A1 * | 7/2005 | Teppler | 713/178 |
| 2005/0190797 | A1 * | 9/2005 | Elliot | 370/503 |
| 2005/0207387 | A1 * | 9/2005 | Middleton et al. | 370/347 |
| 2006/0056377 | A1 * | 3/2006 | Wu et al. | 370/345 |
| 2006/0072694 | A1 * | 4/2006 | Dai et al. | 375/354 |
| 2007/0223477 | A1 * | 9/2007 | Eidson | 370/392 |

OTHER PUBLICATIONS

S. Johannessen, "Time synchronization in a local area network," Control Systems Magazine, IEEE, vol. 24, No. 2, pp. 61-69, 2004. [Online]. Available: http://dx.doi.org/10.1109/MCS.2004.1275432.*

(Continued)

*Primary Examiner* — Ayaz Sheikh
*Assistant Examiner* — Tarell Hampton
(74) *Attorney, Agent, or Firm* — Patterson & Sheridan, L.L.P.

(57) ABSTRACT

Embodiments of the present invention set forth a method and system for reducing uncertainty in receive and transmit timestamps created by an NTP server. The uncertainty in the receive timestamps is removed by recording the time-of-arrival in the hardware clock of the NTP server before the incoming packets may be delayed by traversing the various layers of software in a timestamping system. The uncertainty in the transmit timestamps is removed by giving the outgoing packets a timestamp in the future using an estimate of the transmission latency calculated by the latency estimator filter. Subsequently, the actual time-of-departure is used to re-calculate and update the estimate of the transmission latency. In this fashion, superior control of the timestamping function may be implemented in existing NTP servers in a manner that retains interworking compatibility with the current NTP standards.

10 Claims, 6 Drawing Sheets

OTHER PUBLICATIONS

Johannessen, S.; , "Time synchronization in a local area network," Control Systems, IEEE , vol. 24, No. 2, pp. 61-69, Apr. 2004.*

Johannessen, S. "Time Synchronization in a Local Area Network", Control Systems Magazine, IEEE vol. 24, Issue2, Apr. 2004 pp. 61-69.

English Translation of Chinese Office Action, Chinese Patent Application No. 200780018257.8, dated Oct. 12, 2010.

English Translation of Second Chinese Office Action. Chinese Patent Application 200780018257.8, dated Aug. 17, 2011.

* cited by examiner

NETWORK TIME PROTOCOL PRECISION TIMESTAMPING SERVICE

BACKGROUND OF THE INVENTION

1. Field of the Invention

Embodiments of the present invention generally relate to improving the time-offset accuracy between the transmitter and receiver paths over data networks and, more specifically, to network time protocol precision timestamping service.

2. Description of the Related Art

In many communications applications, each element in a network has its own internal clock running independently of the other clocks in the network. Where the networks are synchronous networks, such as in many telecommunications applications and in high speed wide area networks, these clocks must be synchronized to the server. In legacy telecommunications networks, network elements utilized "TDM" links, such as T1 and SONET, which are inherently capable of carrying timing information from server to client at the physical layer. However, it is generally agreed that next generation networks will be based on a packet-switched infrastructure and, therefore, packet-based methods for transporting timing information will be used. One of the methods for synchronizing clocks in packet-switched data networks is Network Time Protocol (NTP).

Commercial NTP servers typically employ highly accurate hardware based clocks, which are disciplined to the external standards. In turn, NTP clients send carefully crafted packets to NTP servers and analyze their replies in order to determine the offset of the client clock relative to the server clock. A typical packet contains four timestamps. The timestamps are designed to precisely time the transmit and receive paths of the client/server time packet interchange so that the roundtrip delay between the endpoints and the offset of the client clock may be calculated. However, despite the high accuracy of the hardware based clock at the NTP server, if there are any inaccuracies associated with the timestamping function in the NTP server, the NTP server introduces errors into the timestamps provided to the client. Subsequently, these errors propagate to the client clock and compromise proper correction of the client clock.

Most of the inaccuracies within the timestamps created by the NTP server are introduced by various layers of software, including device drivers, network stacks, and the increasing use of non-real-time operating systems. This is illustrated in FIG. 1, conceptually demonstrating a packet timestamping flow in a typical NTP system 100, according to prior art. Most of existing NTP servers include systems such as the NTP system 100. Typically, a timestamp in a packet is supposed to reflect the instant of the arrival or departure referenced to the physical layer interface. With reference to FIG. 1, the physical layer is associated with an Ethernet PHY 110. In this case, the time-of-arrival refers to the instant the first (or the designated) bit of each of the incoming packets traverses the boundary between the external environment (not shown) and the Ethernet PHY 110. Likewise, the time-of-departure is meant to be the instant when the first (or the designated) bit of each of the outgoing packets crosses the said boundary between the Ethernet PHY 110 and the external environment.

As illustrated in FIG. 1, when an incoming packet 102 arrives at the NTP system 100, it passes through several entities: the physical layer associated with the Ethernet PHY 110, an Ethernet Media Access Controller (MAC) 120, operating system (O/S) services 130, an NTP application 140. Some of these entities are physical (such as the Ethernet MAC 120) and some are logical (such as the O/S services 130). A path for the incoming packet 102 is shown with arrows 112, 122, and 132. As shown with an arrow 142, the NTP application 140 requests a timestamp from a hardware clock 150 to be recorded in the incoming packet 102 only after the incoming packet 102 traverses the Ethernet PHY 110, the Ethernet MAC 120, and the O/S services 130 and actually reaches the NTP application 140 (such a timestamp is referred to herein as a "receive timestamp"). Upon receiving a request from the NTP application 140, the hardware clock 150 sends current time value as the receive timestamp, illustrated as timestamps 144. Thus, there is a delay, with a significant random component, between the actual time-of-arrival at the NTP system 100 and the time when the NTP application 140 actually reads the hardware clock 150 to ascertain the value for the receive timestamp.

A similar situation occurs for an outgoing packet 104 leaving the NTP system 100. The NTP application 140 reads current time value from the hardware clock 150 and inserts that value as a timestamp in the appropriate field within the outgoing packet 104 (such a timestamp is referred to herein as a "transmit timestamp"). After the transmit timestamp is inserted, the NTP application 140 launches the outgoing packet 104 on a path shown by arrows 134, 124, and 114. Again, since the outgoing packet 104 must first traverse the O/S services 130, the Ethernet MAC 120, and the Ethernet PHY 110, there is a delay, with a significant random component, between the instant when the transmit timestamp was obtained from the hardware clock 150 and the actual time-of-departure from the NTP system 100. Consequently, inaccurate receive and transmit timestamps propagate from the NTP system 100 to the client clock and set the baseline error for time keeping and rate keeping at the client clock.

As the foregoing illustrates, what is needed in the art is an improved NTP timestamping method which could provide more precise and stable measurement of the transition of the NTP packets.

SUMMARY OF THE INVENTION

One embodiment of the present invention sets forth a method packet for establishing a transmit timestamp to be inserted into an outgoing packet by a network time protocol (NTP) server. The method includes the steps of requesting current time from a hardware clock within the NTP server, and requesting a correction term from a latency estimator filter (LEF), where the correction term is an estimate of a transmission latency associated with the outgoing packet traversing various layers of software before crossing a boundary with external environment. The method also includes the steps of inserting a sum of the current time and the correction term into the outgoing packet as the transmit timestamp, placing the outgoing packet with the transmit timestamp on an outbound queue, triggering the hardware clock to latch a time-of-departure of the outgoing packet, performing steps of an LEF algorithm to update the correction term by calculating an offset between the transmit timestamp and the latched time-of-departure to obtain more accurate transmit timestamp in the next outgoing packet, storing the updated correction term, and using the updated correction term to insert the transmit timestamp into a next outgoing packet.

One advantage of the disclosed systems and methods is that improved control of the timestamping function may be implemented in the existing NTP servers without the risk of introducing interworking incompatibilities with other servers and clients that are compliant with the current NTP standards. Importantly, the disclosed methods include steps that utilize the packet timestamping engine and the latency estimator filter in a manner that retains compatibility with the current NTP standards. In this fashion, the time-of-arrival and time-of-departure are detected and registered by hardware, thereby achieving high degree of precision, and the uncertainty associated with the device drivers, network stacks, operating system, and so on is avoided. As a result, more accurate and stable NTP server timestamps are provided to the NTP client.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
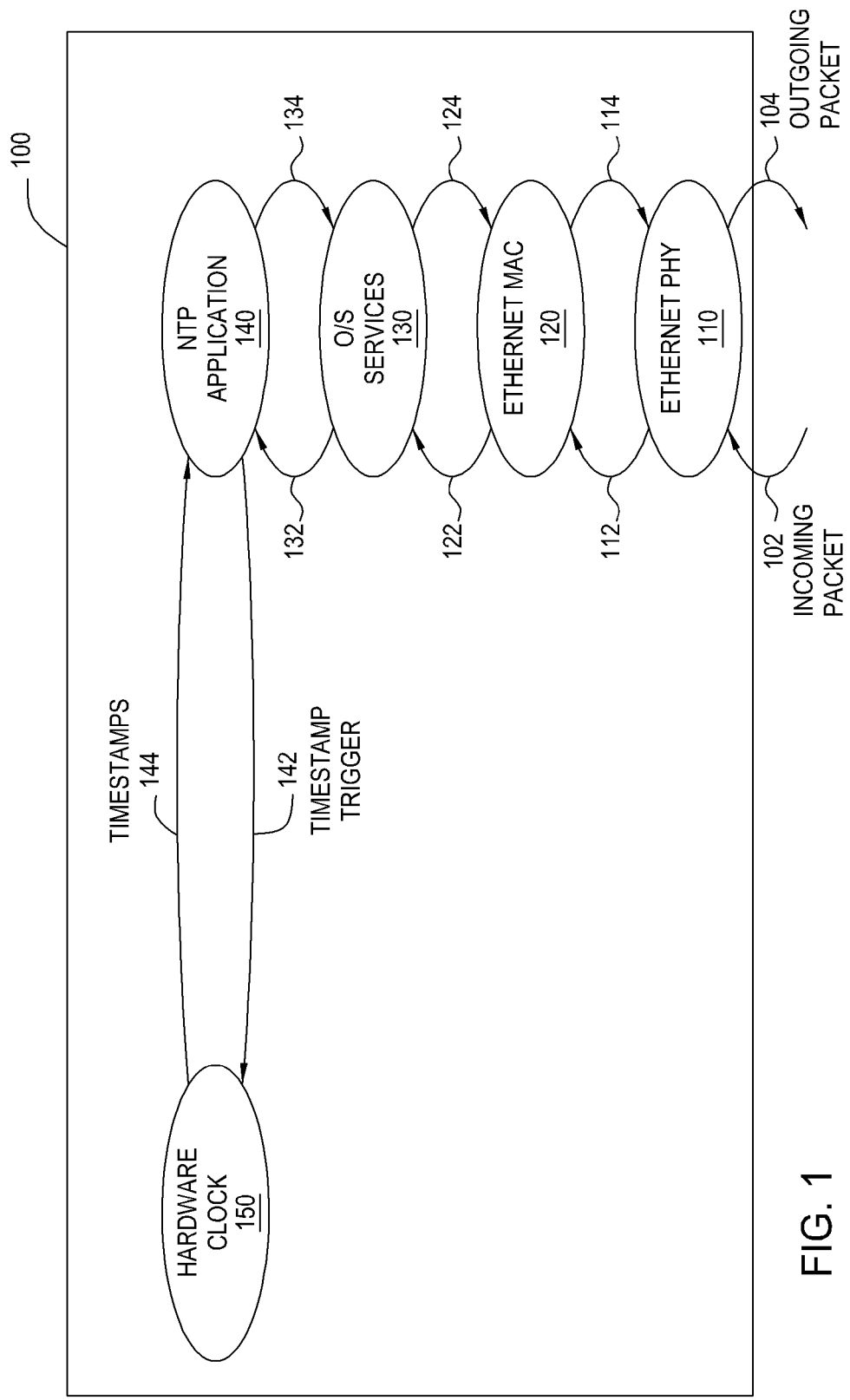
FIG. 1 is a conceptual diagram of a packet timestamping flow in a typical NTP system, according to prior art.
Figure 2:
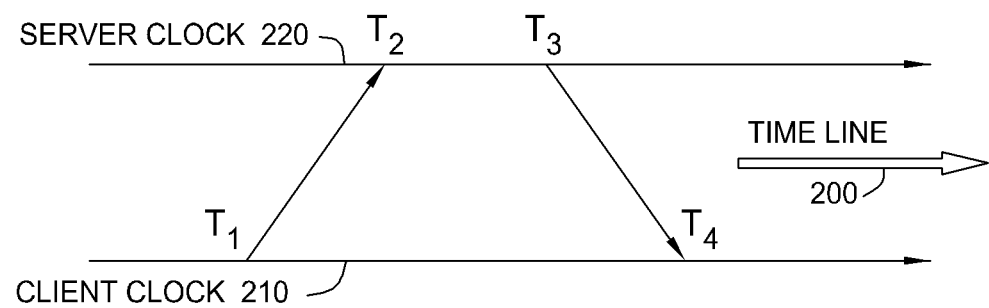
FIG. 2 illustrates timestamps contained in a header of an NTP packet, according to one embodiment of the present invention.

FIG. 2 illustrates timestamps contained in a header of an NTP packet, according to one embodiment of the present invention. As shown in FIG. 2, each time measurement along a time line 200 involves four timestamps, which are defined as follows: $T_1$ is a timestamp representing the best estimate of the transmit originating epoch of a packet originating from a client clock 210, $T_2$ is a timestamp representing the best estimate of the receive termination epoch of a packet terminating at a precision NTP server clock 220, $T_3$ is a timestamp representing the best estimate of the transmit origination epoch of a packet originating from the precision NTP server clock 220, and $T_4$ is a timestamp representing the best estimate of the receive termination epoch of a packet terminating at the client clock 210. After the time measurement, these four timestamps are used to calculate the roundtrip delay between the endpoints and the offset of the client clock 210 according to the following principles:

a) Delay estimate: $\sigma = (T_4 - T_1) - (T_3 - T_2)$ (1)

b) Offset estimate: $\Theta = \dfrac{(T_2 - T_1) + (T_3 - T_4)}{2}$ (2)

c) Error: $\varepsilon = \phi \cdot (T_4 - T_1) + \alpha$ (3)

where $\phi(t)$ is a function that describes the skew accumulation rate of the client clock and $\alpha$ is a measure of uncertainty of the precision NTP server time measurement.

Since the precision NTP server is primarily responsible for providing $T_2$ and $T_3$ to the client clock 210, any inaccuracy in the values of $T_2$ and $T_3$ contribute to inaccuracies in the delay and offset estimates, which, in turn, result in an increased value of uncertainty in the time measurement process $\alpha$. However, equation (3) demonstrates that the precision NTP server can also improve the performance of the time measurement circuit by reducing uncertainty in the time measurement process $\alpha$. The system and method for achieving more accurate and stable time measurements from the precision NTP server are described in FIGS. 3 through 5.

Figure 3:
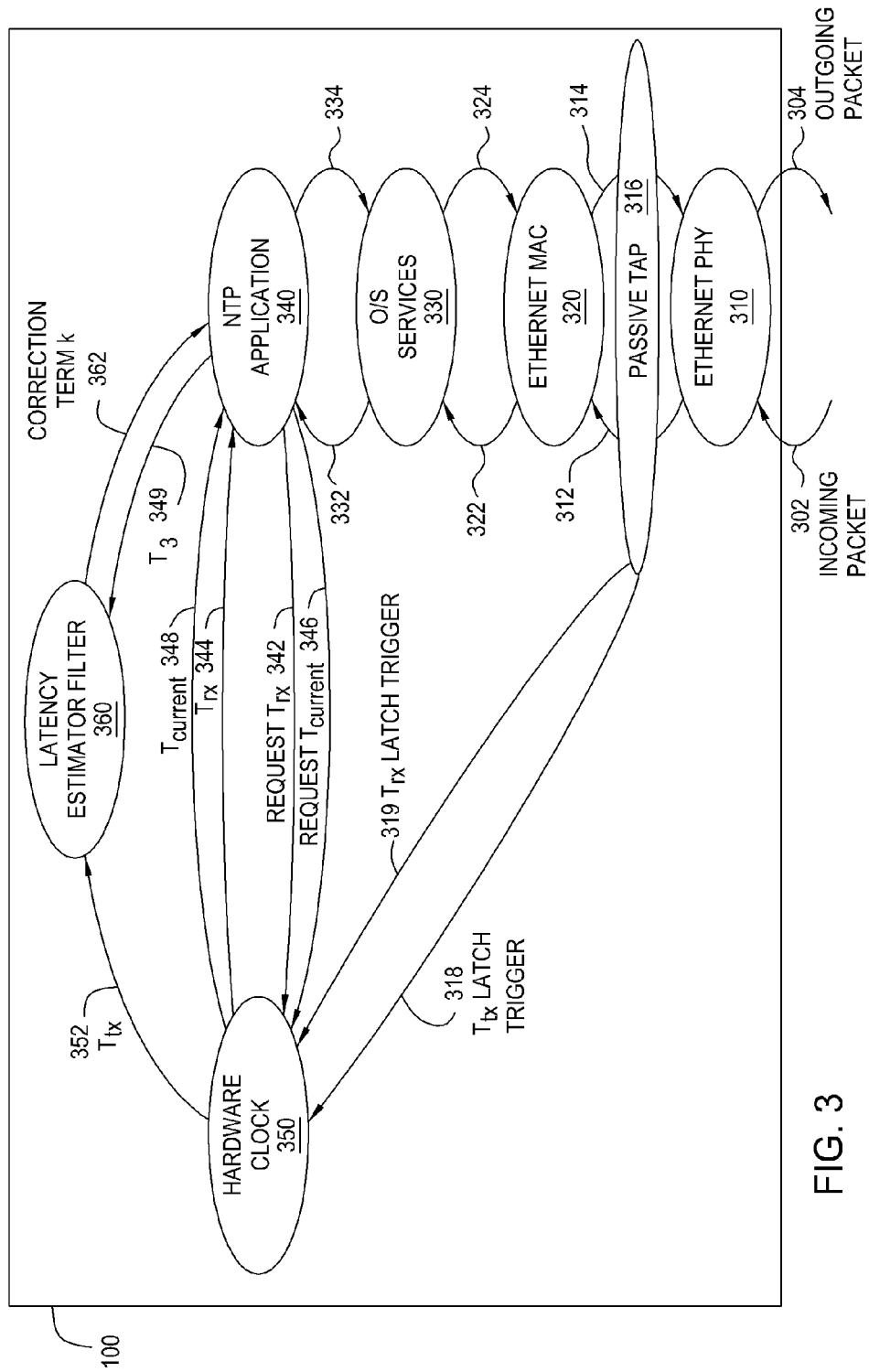
FIG. 3 is a conceptual diagram of a packet timestamping flow in a precision timestamping service (PTS) system, according to one embodiment of the present invention.

FIG. 3 is a conceptual diagram of a packet timestamping flow in a precision timestamping service (PTS) system 300, according to one embodiment of the present invention. As shown, the PTS system 300 includes, without limitation, the physical layer associated with an Ethernet PHY 310, an Ethernet MAC 320, O/S services 330, a NTP application 340, and a hardware clock 350. As previously described, the time-of-arrival (denoted as $T_{rx}$) of an incoming packet 302 refers to the instant the first (or the designated) bit of the incoming packet 302 traverses the boundary between the external environment (not shown) and the Ethernet PHY 310. Subsequently, the first step for the incoming packet 302 that just crossed the said boundary between the external environment and the Ethernet PHY 310 is to continue to the Ethernet MAC 320 through a receive packet channel 312. A path for the incoming packet 302 is shown with arrows 312, 322, and 332. As also previously described, the time-of-departure $T_{tx}$ of an outgoing packet 304 refers to the instant when the first (or the designated) bit of the outgoing packet 304 crosses the said boundary between the Ethernet PHY 310 and the external environment. The last step for the outgoing packet 304 that is about to cross the said boundary between the Ethernet PHY 310 and the external environment is to travel through a transmit packet channel 314 (a path for the outgoing packet 304 is shown with arrows 334, 324, and 314). Combined, the receive packet channel 312 and the transmit packet channel 314 are referred to herein as a "media independent interface (MII) channel."

Importantly, the PTS system 300 further includes a passive tap unit 316 and a latency estimator filter (LEF) 360. The passive tap unit 316 is a packet timestamping engine configured to monitor the network traffic flowing through the MII channel. As each packet goes by, the passive tap unit 316 analyzes the data flowing through the MII channel to determine if the incoming packet 302 is of interest to the NTP application 340 (i.e., if the incoming packet 302 is an NTP packet). If this is the case, the passive tap unit 316 is configured to trigger the hardware clock 350 to latch (i.e., temporarily record) the time-of-arrival, $T_{rx}$, as shown with an arrow 319. Similarly, if the passive tap unit 316 detects the outgoing packet 304 created by the NTP application 340, the passive tap unit 316 triggers the hardware clock 350 to latch the time-of-departure, $T_{tx}$, as shown with an arrow 318. The functionality of a packet timestamping engine such as the passive tap unit 316 that includes monitoring the network traffic flowing through the MII channel and triggering a time latch at the hardware clock 350 may be implemented either in hardware or software. An example of a hardware implementation may be found in U.S. Pat. No. 6,985,499, filed Apr. 17, 2001, and entitled "Precise Network Time Transfer," which is incorporated herein by reference. Persons skilled in the art will recognize that, in different embodiments, the passive tap 316 and the hardware clock 350 may be disposed on/in the same module or on/in different modules.

Figure 4:
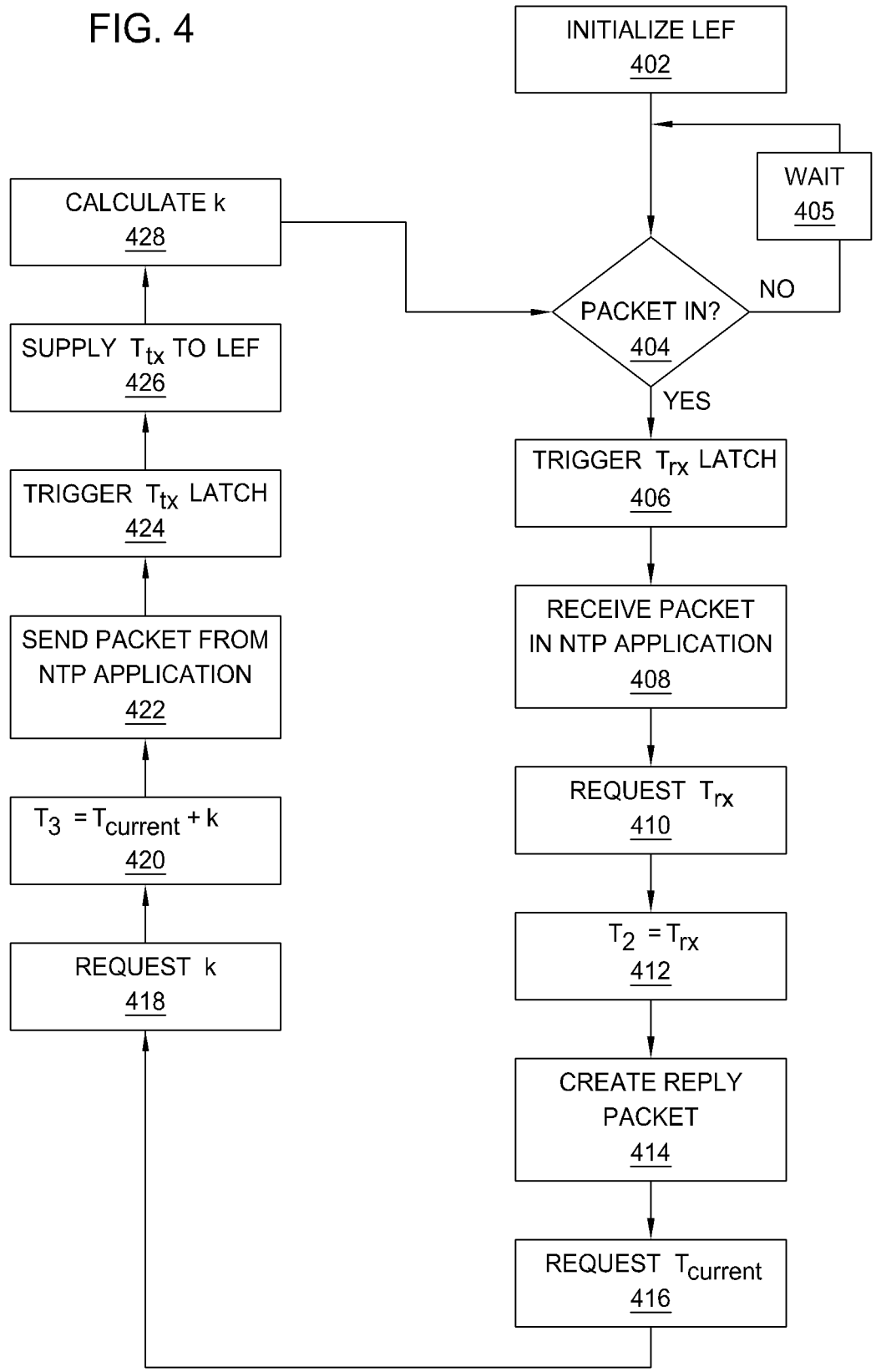
FIG. 4 sets forth a flow diagram of method steps implemented by the PTS system of FIG. 3, according to one embodiment of the present invention.
Figure 5:
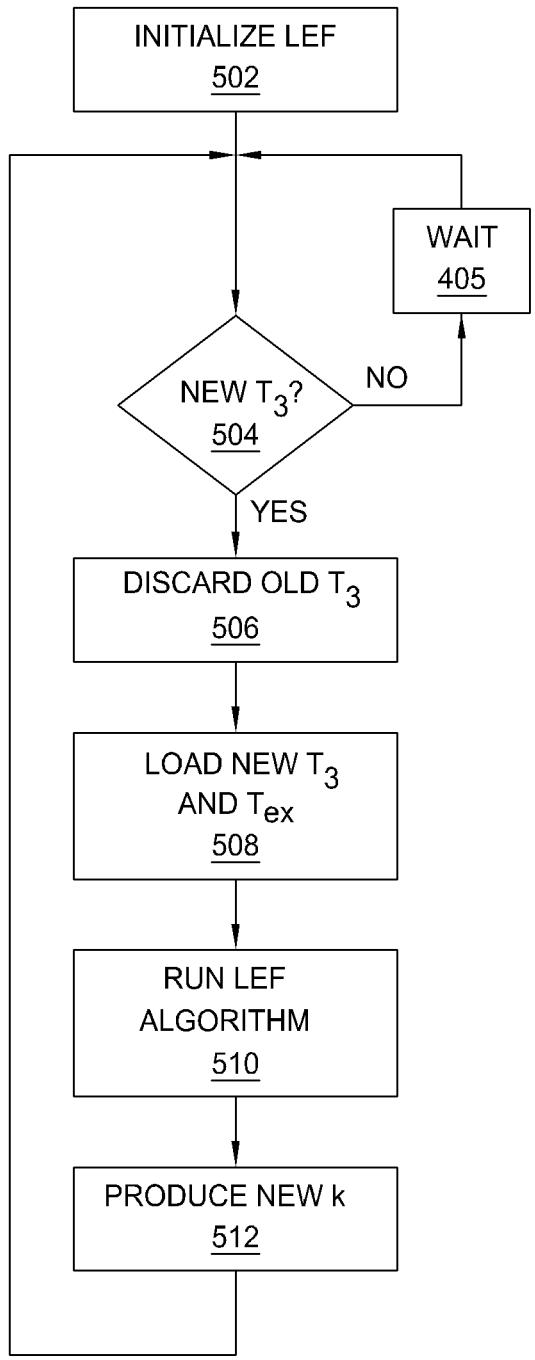
FIG. 5 sets forth a flow diagram of method steps implemented by the latency estimator filter of FIG. 3, according to one embodiment of the present invention.

The LEF 360 is configured to obtain the latched time-of-departure, $T_{tx}$, from the hardware clock 350 and implement methods steps described in FIG. 5 to calculate a correction term k. The correction term k is an estimate of the transmission latency through the precision NTP server that is intended to account for the delays experienced by the NTP packets while traveling between the NTP application 340 and the Ethernet PHY 310. After each NTP client/server packet interchange, the LEF 360 updates the value of the correction term k to maintain the best estimate for the next transmission delay. Using the latched time-of-arrival, $T_{rx}$, and the most recent correction term k calculated by the LEF 360, the PTS system 300 implements method steps described in FIG. 4, producing more precise and stable time measurements of the timestamps $T_2$ and $T_3$.

FIG. 4 sets forth a flow diagram of method steps implemented by the PTS system 300 of FIG. 3, according to one embodiment of the present invention. Although the methods steps are described in conjunction with the system of FIG. 3, persons skilled in the art will understand that any system that performs the methods steps, in any order, is within the scope of the present invention.

The method begins in step 402, where the PTS system 300 initializes the LEF 360 by setting the elements in the array of transmission latencies to zero. In alternative embodiments, the elements in the array of transmission latencies may be set to some other pre-determined values. In step 404, the passive tap unit 316 determines if there is a new incoming packet 302 that is an NTP packet. If there is no new NTP packet, then the method proceeds to step 405 where PTS system 300 waits until the next packet arrives. From step 405 the method returns to step 404.

If, in step 404, the passive tap unit 316 determines that a new incoming packet 302 is an NTP packet, then the method proceeds to step 406, where the passive tap unit 316 triggers the hardware clock 350 to latch the time-of-arrival $T_{rx}$. As the incoming packet 302 traverses the Ethernet MAC 320 and the O/S services 330, the method proceeds to step 408 where the incoming packet 302 is received at the NTP application 340. Once the NTP application 340 recognizes that the incoming packet 302 has arrived, the method proceeds to step 410, where the NTP application 340 requests the latched time-of-arrival, $T_{rx}$, from the hardware clock 350, as shown in FIG. 3 with an arrow 342. After the NTP application 340 obtains the requested latched time-of-arrival, $T_{rx}$, as shown in FIG. 3 with an arrow 344, the method proceeds to step 412. In step 412, the NTP application 340 inserts the timestamp $T_2$ with a value equal to $T_{rx}$ into the incoming packet 302. Note that this approach of determining the timestamp $T_2$ is quite different from the method of operation in the typical NTP system 100 where, upon sending the timestamp trigger 142 to the hardware clock 150, the NTP application 140 receives current time value as opposed to the time value representing the instant in the past when the incoming packet 102 actually arrived.

In step 414, the NTP application 340 creates a reply packet for the incoming packet 302. As the reply packet has not yet been transmitted, no corresponding transmit information is available from the hardware clock 350. In step 416, the NTP application 340 requests the current time, $T_{current}$, from the hardware clock 350, as shown in FIG. 3 with an arrow 346. After the NTP application 340 obtains the requested current time, $T_{current}$, as shown in FIG. 3 with an arrow 348, the method proceeds to step 418. In step 418, the NTP application 340 requests the correction term k from the LEF 360. An arrow 362 in FIG. 3 illustrates the LEF 360 sending the correction term k to the NTP application 340. In step 420, the NTP application 340 adds the correction term k, which is an estimate of the transmission latency through the precision NTP server, to the value of $T_{current}$ obtained from the hardware clock 350 and inserts the result as the timestamp $T_3$ into the reply packet. The timestamp $T_3$ is also sent to the LEF 360.

In step 422, the NTP application 340 places the reply packet with the timestamp $T_3$ on the outbound queue as the outgoing packet 304. As the outgoing packet 304 traverses the O/S services 330, the Ethernet MAC 320, and is detected by the passive tap unit 316, the method proceeds to step 424. In step 424, the passive tap unit 316 triggers the hardware clock 350 to latch the actual time-of-departure $T_{tx}$. The method then proceeds to step 426, where the hardware clock 350 supplies the value of the actual time-of-departure, $T_{tx}$, to the LEF 360, as shown in FIG. 3 with an arrow 352. In turn, in step 428, the LEF 360 implements method steps that are described in more detail in FIG. 5 and calculates an updated value for the correction term k. The method then returns to step 404, described above.

FIG. 5 sets forth a flow diagram of method steps implemented by the LEF (latency estimator filter) 360 of FIG. 3, according to one embodiment of the present invention. Again, although the methods steps are described in conjunction with the system of FIG. 3, persons skilled in the art will understand that any system that performs the methods steps, in any order, is within the scope of the present invention.

The LEF 360 is designed to smooth jitter in correction term update. This is accomplished by maintaining a small array of transmission latencies with the newest entry forcing the oldest entry out of the array. The array may be denoted as $\{\mu_i, \mu_{i-1}, \mu_{i-2}, \ldots, \mu_{i-N}\}$, where N+1 is the number of elements in the array. In one embodiment, the array may contain only 2 elements, in which case N is equal to 1.

The method begins in step 502, where, as described in step 402 of FIG. 4, the PTS system 300 initializes the LEF 360 by setting the values of the elements in the array of transmission latencies to zero. In alternative embodiments, the variables in the array of transmission latencies may be set to some other pre-determined values. In step 504, the LEF 360 determines if there is a new timestamp $T_3$ provided by the NTP application 340. If there is no new timestamp $T_3$, then the method proceeds to step 505, where the LEF 360 waits for a certain amount of time. From step 505 the method returns to step 504.

If, in step 504, the LEF 360 determines that there is a new timestamp $T_3$ (as shown in FIG. 3 with an arrow 349), then the method proceeds to step 506, where the LEF 360 discards the old timestamp $T_3$. The method then proceeds to step 508, where the LEF 360 loads the new timestamp $T_3$ obtained from the NTP application 340 as well as the value of the actual time-of-departure, $T_{tx}$, provided by the hardware clock 350. The method then proceeds to step 510.

In step 510, the LEF 360 executes the steps of an LEF algorithm to sort the array of transmission latencies and chose the minimum value as the next value of the correction term k. In one embodiment, using the variables defined above, the LEF algorithm of step 510 is as follows:

Step 1: $\mu_{i-1} = \mu_i$ (bump the array down by one)
Step 2: $\mu_i = T_{tx} - T_3 + k$ (update the transmission latency)
Step 3: $k = \min(\mu_{i-1}, \mu_i)$ (calculate the new value for the correction term)

As a result of executing the steps of the LEF algorithm, in step 512, the LEF 360 produces an updated value for the correction term k, which represents an estimate of the transmission latency through the precision NTP server. The updated correction term k is stored and subsequently used in calculating the next transmit timestamp $T_3$ for the reply packet, as described in FIG. 4. Persons skilled in the art will recognize that alternate algorithms for calculating the best estimate of the correction term k may be utilized as well, without departing from the basic scope of the present invention. The LEF algorithm presented in this embodiment constitutes a computationally efficient operation. From step 512, the method returns to step 502, described above.

Figure 6:
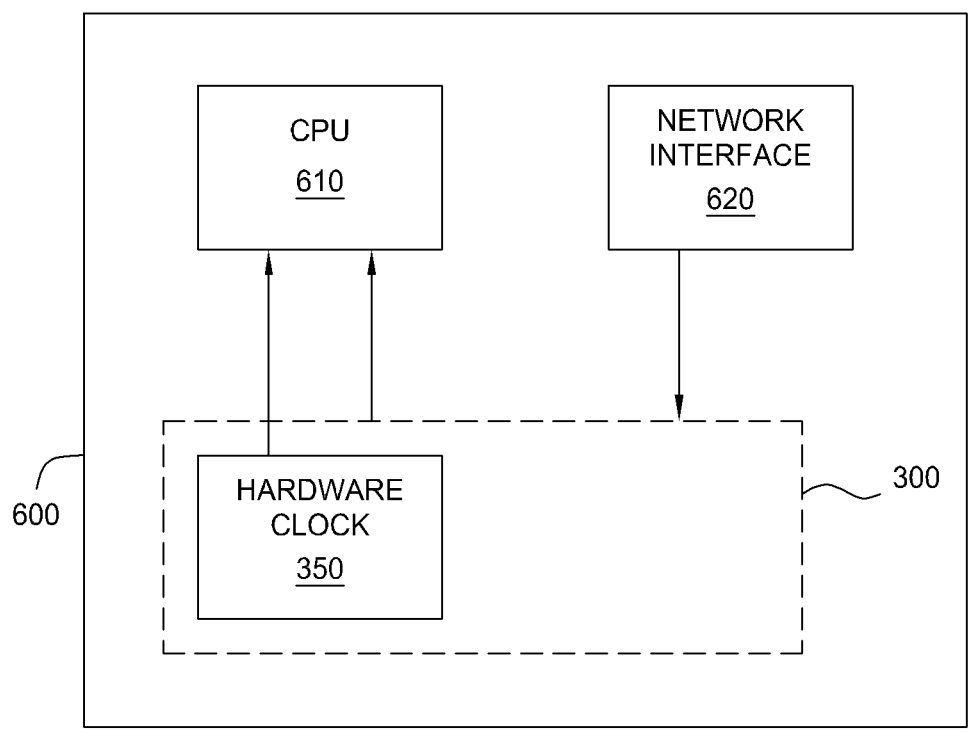
FIG. 6 is a conceptual diagram of a precision NTP server configured to implement one or more aspects of the present invention.

FIG. 6 is a conceptual diagram of a precision NTP server 600 configured to implement one or more aspects of the present invention. As shown, the precision NTP server 600 includes, without limitation, a central processing unit (CPU) 610, a network interface 620, and the PTS system 300, which further includes the hardware clock 350. The network interface 620 communicates packets with the PTS system 300, which, in turn, communicates with the CPU 610 and implements the method steps described herein to establishes the receive and transmit timestamps $T_2$ and $T_3$.

The present invention enables a precision NTP server to
Monitor network traffic flowing through a MIu channel, calculate transmission latency through the precision NTP server, insert a receive timestamp $T_2$ into an incoming NTP packet based on time-of-arrival latched by a hardware clock, insert a transmit timestamp $T_3$ into an outgoing NTP packet based on an estimate for the transmission latency that the outgoing NTP packet is expected to experience, and update an estimate of the transmission latency after each NTP client/server packet interchange by performing the steps of
Detecting an incoming packet from a precision NTP client immediately after the incoming packet crosses the boundary between the external environment and the physical layer of the precision timestamping service (PTS) system;
Triggering a time latch at the hardware clock to temporarily record time-of-arrival of the incoming packet;
Retrieving the latched time-of-arrival from the hardware clock and inserting a receive timestamp $T_2$ equal to the latched time-of-arrival into the incoming packet;
Requesting current time from the hardware clock and most recent estimate of the transmission latency from a latency estimator filter and inserting a transmit timestamp $T_3$ equal to the sum of the current time and the most recent estimate of the transmission latency into the outgoing packet before the outgoing packet actually crosses the boundary between the physical layer of the PTS system and the external environment;
Detecting an outgoing packet immediately before the outgoing packet crosses the boundary between the physical layer and the external environment;
Triggering a time latch at the hardware clock to temporarily record the time-of-departure of the outgoing packet;
Updating the estimate of the transmission latency by calculating the offset between the software calculated transmit timestamp value and the actual measured transmit timestamp and filtering the difference to chose the minimum value of the transmission latency as the next estimate of the transmission latency;
Provide more accurate and stable measurements of the transitions of the NTP packets both into, and out of, the precision NTP server compared to the prior art methods.

One advantage of the disclosed systems and methods is that significantly better control of the timestamping function may be implemented in the existing NTP servers without the risk of introducing interworking incompatibilities with other servers and clients that are compliant with the current NTP standards. The disclosed precision timestamping service (PTS) system includes a packet timestamping engine implemented in hardware and configured to recognize NTP packets. The disclosed PTS system further includes a latency estimator filter configured to calculate an estimate of the transmission latency through various layers of software in NTP servers. Importantly, the disclosed methods include steps that utilize the packet timestamping engine and the latency estimator filter in a manner that retains compatibility with the current NTP standards. In this fashion, the time-of-arrival and time-of-departure are detected and registered by hardware, thereby achieving high degree of precision, and the uncertainty associated with the device drivers, network stacks, operating system, and so on is avoided. As a result, more accurate and stable NTP server timestamps are provided to the NTP clients.

One embodiment of the present invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention.

Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention.

While the foregoing is directed to embodiments of the present invention, other and further embodiments of the invention may be devised without departing from the basic scope thereof.

I claim:

1. A method for establishing transmit timestamps to be inserted into outgoing packets, the method comprising:
creating a first outgoing packet;
requesting current time from a hardware clock;
inserting a sum of the current time and a correction term associated with an estimated latency into the first outgoing packet as the transmit timestamp;
placing the first outgoing packet with the transmit timestamp in an outbound queue;
monitoring network traffic flowing through a media independent interface (MII) channel to detect the first outgoing packet;
triggering the hardware clock to latch a time-of-departure of the detected first outgoing packet;
updating the correction term associated with an estimated latency based on the latched time-of-departure;
creating a second outgoing packet;
requesting current time from a hardware clock;
inserting a sum of the current time and the updated correction term into the second outgoing packet as the transmit timestamp; and
placing the second outgoing packet with the transmit timestamp in the outbound queue.

2. The method of claim 1, wherein the outgoing packet is created as a reply to an incoming packet.

3. The method of claim 1, wherein the correction term, k, is updated in the following manner:
Step 1: Move elements of an array of transmission latencies down by one, where $\mu_i$ is a current transmission latency and $\mu_{i-1}$ is an immediately preceding transmission latency:

$\mu_{i-1} = \mu_i;$

Step 2: Update most recent transmission latency, where $T_{tx}$ is the transmit timestamp, and $T_3$ is the latched time-of-departure:

$\mu_i = T_{tx} - T_3 + k;$ and

Step 3: Calculate a new value for the correction term:

$k = \min(\mu_{i-1}, \mu_i).$

4. A precision timestamping service (PTS) system configured to insert a transmit timestamp into an outgoing packet, the system comprising:
a physical layer associated with an Ethernet PHY;
an Ethernet media access controller (MAC);
a media independent interface (MII) channel connecting the Ethernet PHY and the Ethernet MAC;
a hardware clock configured to provide current time and to latch a time-of-departure of the outgoing packet;
a network time protocol (NTP) application configured to create the outgoing packet, insert a sum of the current time and a correction term associated with an estimated latency into the outgoing packet as the transmit timestamp, and place the outgoing packet with the transmit timestamp in an outbound queue;
a passive tap unit configured to monitor network traffic flowing through the MII channel to detect the outgoing packet and trigger the hardware clock to latch the time-of-departure of the detected outgoing packet; and
a latency estimator filter configured to update the correction term associated with an estimated latency based on an offset between the transmit timestamp and the time-of-departure latched by the hardware clock.

5. The system of claim 4, wherein the outgoing packet is created as a reply to an incoming packet from an NTP client.

6. The system of claim 4, wherein the correction term, k, is updated in the following manner:
Step 1: Move elements of an array of transmission latencies down by one, where $\mu_i$ is a current transmission latency and $\mu_{i-1}$ is an immediately preceding transmission latency:

$\mu_{i-1} = \mu_i;$

Step 2: Update most recent transmission latency, where $T_{tx}$ is the transmit timestamp, and $T_3$ is the latched time-of-departure:

$\mu_i = T_{tx} - T_3 + k;$ and

Step 3: Calculate a new value for the correction term:

$k = \min(\mu_{i-1}, \mu_i).$

7. A method for establishing timestamps to be inserted into packets, the method comprising:
creating an outgoing packet;
inserting a sum of a current time and a correction term associated with an estimated latency into the outgoing packet as a transmit timestamp;
monitoring network traffic flowing through a media independent interface (MII) channel to detect transmission of the outgoing packet through the MII;
triggering the hardware clock to latch a time-of-departure of the outgoing packet when the outgoing packet is transmitted through the MII; and
updating the correction term associated with an estimated latency based on the latched time-of-departure.

8. The method of claim 7, further comprising:
monitoring network traffic flowing through the MII channel to detect an incoming packet;
triggering a hardware clock to latch a time-of-arrival of the detected incoming packet; and
inserting the latched time-of-arrival into the incoming packet as a receive timestamp.

9. The method of claim 7, wherein the time indicated by the transmit timestamp is less than or greater than the latched time-of-departure.

10. The method of claim 7, wherein the correction term, k, is updated in the following manner:
Step 1: Move elements of an array of transmission latencies down by one, where $\mu_i$ is a current transmission latency and is an immediately preceding transmission latency:

$\mu_{i-1} = \mu_i;$

Step 2: Update most recent transmission latency, where $T_{tx}$ is the transmit timestamp, and $T_3$ is the latched time-of-departure:

$\mu_i = T_{tx} - T_3 + k;$ and

Step 3: Calculate a new value for the correction term:

$k = \min(\mu_{i-1}, \mu_i).$

* * * * *